US012674506B2

(12) United States Patent
Kaurić et al.

(10) Patent No.: US 12,674,506 B2
(45) Date of Patent: Jul. 7, 2026

(54) DRIVETRAIN FOR A VEHICLE

(71) Applicant: Rimac Technology LLC, Sveta Nedelja (HR)

(72) Inventors: Mario Kaurić, Glina (HR); Igor Gračner, Vrbovec (HR); Ljudevit Putarek, Ivanec (HR)

(73) Assignee: RIMAC TECHNOLOGY LLC, Sveta Nedelja (HR)

( * ) Notice: Subject to any disclaimer, the term of this patent is extended or adjusted under 35 U.S.C. 154(b) by 228 days.

(21) Appl. No.: 18/667,527

(22) Filed: May 17, 2024

(65) Prior Publication Data

US 2024/0392871 A1 Nov. 28, 2024

(30) Foreign Application Priority Data

May 22, 2023 (EP) ..................................... 23174425

(51) Int. Cl.
*F16H 57/021* (2012.01)
*F16H 57/022* (2012.01)

(52) U.S. Cl.
CPC ... *F16H 57/021* (2013.01); *F16H 2057/0221* (2013.01)

(58) Field of Classification Search
CPC ........ F16H 1/22; F16H 37/06; F16H 37/0833; B60K 17/165
See application file for complete search history.

(56) References Cited

U.S. PATENT DOCUMENTS

| | | | | |
|---|---|---|---|---|
| 5,509,862 | A | * | 4/1996 | Sherman ................. F16H 48/06 74/665 F |
| 11,865,908 | B2 | * | 1/2024 | Lutz .......................... B60K 1/02 |
| 2010/0187026 | A1 | * | 7/2010 | Knoblauch .......... B60K 17/043 180/65.1 |
| 2020/0011407 | A1 | * | 1/2020 | Bair ......................... F16C 17/02 |
| 2021/0188067 | A1 | * | 6/2021 | Gayney ................. B60K 17/22 |
| 2024/0247703 | A1 | * | 7/2024 | Skardelly ............. B60K 7/0007 |

FOREIGN PATENT DOCUMENTS

| | | | |
|---|---|---|---|
| DE | 102020117451 | | 1/2022 |
| DE | 102020117451 A1 | * | 1/2022 ........... B60K 17/043 |
| EP | 2310220 | | 4/2011 |

OTHER PUBLICATIONS

Translation of DE 102020117451 A1, obtained from FIT Database (Year: 2022).*
EPO, Extended European Search Report for EP Application No. 23174425.1, Oct. 20, 2023.

* cited by examiner

*Primary Examiner* — Thomas C Diaz
(74) *Attorney, Agent, or Firm* — Hodgson Russ LLP

(57) ABSTRACT

A drivetrain comprises a frame, two driving lines supported by the frame and supporting elements located within the frame and adapted to bear and/or sustain the driving lines themselves; the drivetrain further comprises at least an intermediate element directly interposed between the first driving line and the second driving line and adapted to share and transmit axial loads active in the first driving line into the second driving line and/or axial loads active in the second driving line into the first driving line and/or axial loads active into the first and/or second driving line into the frame.

11 Claims, 6 Drawing Sheets

DRIVETRAIN FOR A VEHICLE

CROSS-REFERENCE TO RELATED APPLICATION(S)

This application claims priority to European Patent Application No. 23174425.1, filed May 22, 2023, the entire disclosure of which is incorporated herein by reference.

TECHNICAL FIELD

The present disclosure is related to a drivetrain—or otherwise stated in the language of the technical sector of pertinence, a gearbox (which therefore can be considered an equivalent definition within the wording of the present disclosure)—which can typically be connected between one or more power sources, such as for example electric motors, and one or more driving wheels (or axles connected to such driving wheels) of a vehicle, and to a vehicle housing one or more of such drivetrains or gearboxes.

BACKGROUND

It is known in the art that gearboxes are usually placed between a driving (or "traction") wheel and a motor/engine in order to achieve a multiplying effect on the torque: to this aim, drivetrains and/or gearboxes are designed in order to cope with mechanical stresses coming from both ends of the kinematic chain wherein they reside, and in order to keep their structural integrity as long as they are subjected to torque originating in both directions as well as some transient loads (bumps, inertial forces, etc.) which could likely be much higher than drive torque for short periods of time.

In the development of electrically-powered vehicles, drivetrain and/or gearboxes play an important role for various reasons, e.g., owing to the fact that electric machines usually operate at very high rotational speed which needs to be reduced to drive the wheels: this often leads to the definition of single reduction ratio drivetrains/gearboxes, or in some limited cases, of drivetrains/gearboxes with two or more interchangeable transmission ratios.

Besides, it is also to be observed that electrically powered vehicles can host more than one (electric) engine/motor, and as a consequence of this gearboxes/drivetrains should be designed and built in order to be properly coupled with the overall torque availability given from such multiple motors designs (usually, this coupling occurs by dedicating each single motor to its respective drivetrain).

Owing to the fact that gearboxes/drivetrains are usually made up of a sequence of gears resting on respective shafts (and such gears are placed in a given relative spatial displacement/sequence within a containing "cover" of the gearbox itself), when the torque coming from the motor is channelled through such gears, internal mechanical loads are generated in the area of intermeshing between two adjacent gears.

More in detail, the following force/load components can be generated in the just cited intermeshing region:

- radial components (responsible for bending of the shaft and for determining a radial load on the drivetrain bearings);
- axial components (e.g., in case of usual helix gears, responsible for bending of the shaft and for determining radial and axial forces on the bearings); and
- tangential components (causing bending of the shaft, torsional stress on the shaft namely, on the part of the shaft which is torsionally loaded—and radial forces on the bearings), and in this complex system of loads, the design of a drivetrain must compensate and consider all the aforecited condition of mechanical stress.

In gearbox configurations of the known type, the internal axial loads are usually discharged on the bearings which support the gears' shafts, and such bearings can be rather cumbersome in terms of positions and/or sheer number and dimensions: therefore, in the known layouts of gearboxes/drivetrains, a significant drawback arises in terms of complexity, mass/weight, productive cost and excessive volume occupancy (this last drawback is becoming more and more significant owing to the fact that such gearboxes can be coupled to at least two engines/motors, and therefore they need to be as narrow as they can be notwithstanding the very high degree of axial loads that are discharged into them by a twin motor architecture (such axial loads are produced because of gears having a non-zero helix angle).

SUMMARY

Having stated the prior art drawbacks, it is an object of the present disclosure to provide a drivetrain (or gearbox) which can overcome the aforementioned drawbacks, and which can withstand a very high torque by efficiently sustaining any kind and/or "direction" of loads deriving from such a high torque itself. At the same time, the present disclosure aims to obtain a drivetrain wherein a substantial reduction of the size of the bearings is possible (by design and manufacturing), so as to enable a reduction—at least, in some cases—of the so-called "height" and/or the "length" and/or of any other characteristic dimension of the drivetrain itself such as the relative axis distance in a T-shaped configuration. Having just cited a T-shaped configuration, a main aim of the present disclosure is to provide a drivetrain capable of efficiently coping with the mechanical loads in a so-called "T-shape" configuration/design: such an embodiment of the disclosure is therefore capable to withstand axial forces/loads coming from the two flow paths for torques respectively generated by the two engines which are mounted on opposite sides of the drivetrain itself, and such axial loads can be balanced or imbalanced depending on the various driving situations (e.g., driving in a straight line or cornering, accelerating or braking and so on), on varying driver's inputs and on any possible automated input imparted by the vehicle's onboard systems such as ABS, TCS, ESC or torque vectoring control systems.

At the same time, the present disclosure aims to provide a drivetrain/gearbox wherein a significant internal loads' reduction is achieved, thereby determining a significant reduction in space/volume occupancy, a reduction in the overall number of components of the drivetrain, and a better productive economy and shorter and easier assembling procedures as well (e.g., by allowing smaller, cheaper, lighter bearings, better packaging and reduction of losses).

BRIEF DESCRIPTION OF THE DRAWINGS

These aims, along with other technical advantages, will be achieved by a drivetrain or gearbox as in the present disclosure as described and claimed hereinafter, and represented in an exemplificative yet not limiting embodiment in the annexed figures, wherein:

DETAILED DESCRIPTION

Figure 1:
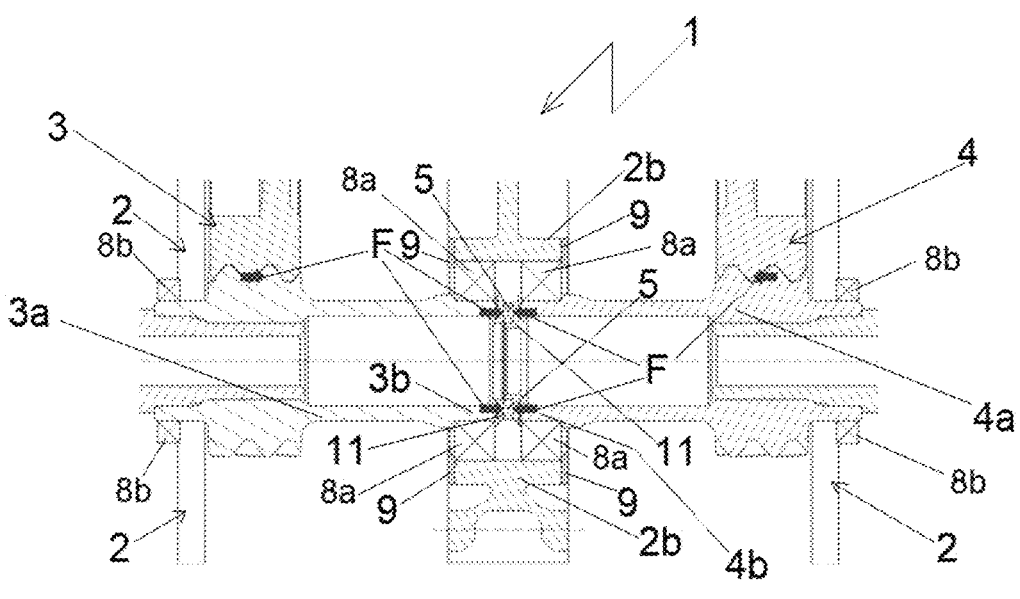
FIGS. 1 and 2 are cross-section views of a possible embodiment of the drivetrain as in the disclosure in two different operating situations (wherein axial loads are figuratively depicted)

In the annexed figures, the drivetrain/gearbox (whose main yet not limiting "destination of use/application" may conveniently be in/for terrestrial vehicles such as automobiles and so on) as in the disclosure as a whole has been numbered with "1" and it mainly comprises a frame (2), a first driving line (3) supported by the frame (2) (and connectable to a first torque transfer element (100) (e.g., a "first motor/engine" or more in general to any kind of shaft or kinematic joint/chain which can be found in a vehicle's drivetrain) and also a second driving line (4) supported by the frame (2) and connectable to a second torque transfer element (200) (which can be of any analogous kind of structural components as already exemplified with regard to the first torque transfer element).

In the annexed drawings, the first and second torque transfer elements are partially visible, and as previously stated, they can conveniently be any kind of power source or motor, even of the known type: therefore, a further level of detail on those components is not required in order to clarify the scope of the present disclosure. The first driving line (3) and the second driving line (4) are in a juxtaposition relationship within the frame (2): as in the wording used in the present disclosure, such a mutual juxtaposition can therefore be defined as if the two driving lines (3; 4) are axially facing each other.

The drivetrain (1) as in the disclosure advantageously comprises at least an intermediate element (5) directly interposed between the first driving line (3) and the second driving line (4): from a functional standpoint, the just cited intermediate element (5) is adapted/dedicated to share and transmit one or more of the following:

axial loads active in the first driving line (3) into the second driving line (4);

axial loads active in the second driving line (4) into the first driving line (3);

axial loads active into the first and/or second driving line (4, 3) into the frame (2).

As in the disclosure, the expression "load active in a driving line" implies that the structural components of such driving lines are undergoing to a "torque flow", which is therefore acting (or insisting) on the structural components themselves. Conveniently, the intermediate element (5) is capable to transmit axial force between the two driving lines (3) and (4) which are mutually faced in correspondence of coaxial shafts (and coaxial shafts are commonly found in T-shaped gearboxes/drivetrains).

It is also to be noted that thanks to the presence of the intermediate element (5), axial forces will mostly cancel out, or balance out, through this bearing, but as this element/bearing will have a minimal moving/rotating speed difference (that is, essentially the same speed or a significantly small difference in speed values) relative to the shafts of the driving lines (3) and/or (4): by keeping the moving/rotating speed at a minimum (or even zero) level of quantitative difference, power losses here will be accordingly minimized (and at the same time, the cancelling of the axial forces significantly reduces loads on the other bearings within the driving lines, allowing for the usage of smaller and lighter bearings and for the lowering of loads transmitted onto the frame).

It is also to be noted that, since axial loads in such kind of driving lines are essentially correlated to the vectorial subdivision of the internal reactions in the zones of inter-meshing of gears (and since usually such gears have a helicoidal pattern, it is thereby useful to think of this active force on the gear mesh in terms of its components in radial, tangential and axial direction), the present disclosure is able to efficiently cope with a wide range of angles of such helical gears.

Turning now back to structural features and looking closely at the annexed figures, it can be observed that the intermediate element (5) is residing in a mutual proximity area (6) defined in correspondence of a central plane (2a) of the frame (2): such a central plane (2a) comprises at least a central supporting member (2b) and defines, from a geo-metrical standpoint, a first half-space and a second half-space which are mutually opposite, with respect to the central plane (2a), so that each of these half-spaces respectively house the first and the second driving line (3), (4).

As in the disclosure, the intermediate element (5) also allows a difference in relative rotation between the two driving lines in the area wherein they come into a condition of mutual proximity: this allowance lets the two "sides" (e.g., the two driving lines (3) and (4)) to work by setting into rotation their respective kinematic chains while the sharing and re-distribution of the axial loads takes place in a "dedicated area" (which can be structurally identified as the already cited mutual proximity area (6)): more in general as in the disclosure any kind of intermediate element/bearing will be deemed "suitable" as long as it is capable of transmitting the axial force (e.g., not just bearings meant exclusively/mainly for axial force transmission) and as long as it is capable of allowing different relative rotational speeds of two "sides" of the drivetrain itself.

Keeping in mind what just stated and looking now to FIG. 1, a possible working/operative condition of the drivetrain (1) as in the disclosure is shown, wherein a given scheme of axial forces (F) is arising and is oriented towards the central plane (2a) of the frame (2) (such a scheme of forces may derive from an accelerating condition of the vehicle, and in this case one of the possible "sources" of these axial loads is constituted by the engines providing a torque input under command of the vehicle's driver): in this scheme, axial forces acting "inwards" are cancelled out on the intermedi-ate element (5) which exemplificatively may comprise a bearing which allows relative rotational speed between shafts (3a; 4a) belonging to first driving line (3) and second driving line (4).

Otherwise stated, the intermediate element (5) allows for relative rotational speed between the shaft belonging to the first driving line (3) and the shaft belonging to second driving line (4): these shafts are in a contact relationship with the intermediate element (5) in mutual proximity area (6).

Generally speaking, the direction of axial force is deter-mined by the "torque direction", which is a consequence of a given driving state or condition (e.g. "positive" driving, when the user/driver of a vehicle commands the motor(s) to have a torque output towards the gearbox, or "regenerative" driving, when the vehicle is slowing down and its internal systems convert kinetic energy into electrical charge) and the so-called "helix angle" of the gears' teeth: such a helix angle on the gears may therefore be designed in any suitable and/or known way, as in the design and/or functional requirements of the drivetrain (1).

Acceleration/deceleration of the vehicle is not exclusively defining the direction of axial forces/loads within the drivetrain, but usually as acceleration loads are more frequent (in terms of timely occurrence) and/or higher in value, for best benefit of this disclosure the gears' teeth helix angle can conveniently be oriented in such a way to generate inward acting axial forces in an "accelerating vehicle" driving condition.

Figure 2:
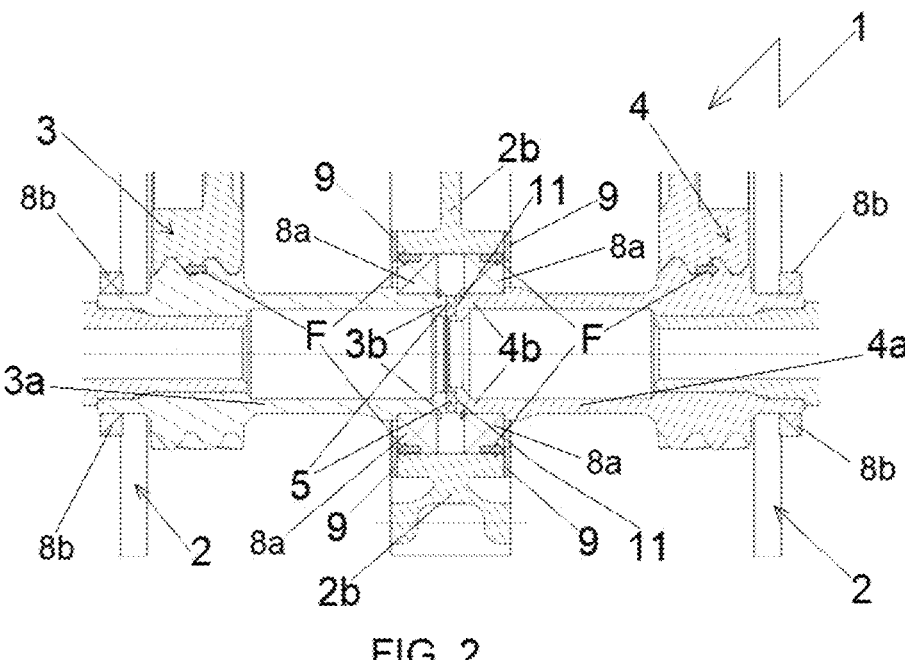

FIG. 2 shows a possible scheme of axial forces (F) which are acting "outwards" (i.e., away from the central plane (2a) of the frame (2)): such a scheme may be related to a deceleration of the vehicle, or to the intervention of a regenerative braking system, whereby such forces are transmitted into the drivetrain (1), and by exploiting the structural features of the disclosure, the axial loads are discharged, after having been shared (and therefore distributed) through the intermediate element (bearing (5), onto the external containment structure of the frame (2).

Regarding the just cited example, it can be observed that deceleration of the vehicle would not necessarily cause the loads through the gearbox as most of the deceleration on significant speeds comes from air resistance and tire friction, therefore the axial loads in this driving condition are generated by:

losses generated in the motor(s), which in turn can be considered as being located "upstream" or "before" the position of this disclosure (which however can be consisting in a "lesser" order of magnitude from the quantitative standpoint, if compared to other losses/ causes of deceleration of the vehicle); and losses generated in relationship with regenerative braking (which can be consisting in a "greater" order of magnitude from the quantitative standpoint, if compared to other losses/causes of deceleration of the vehicle).

Figure 4:
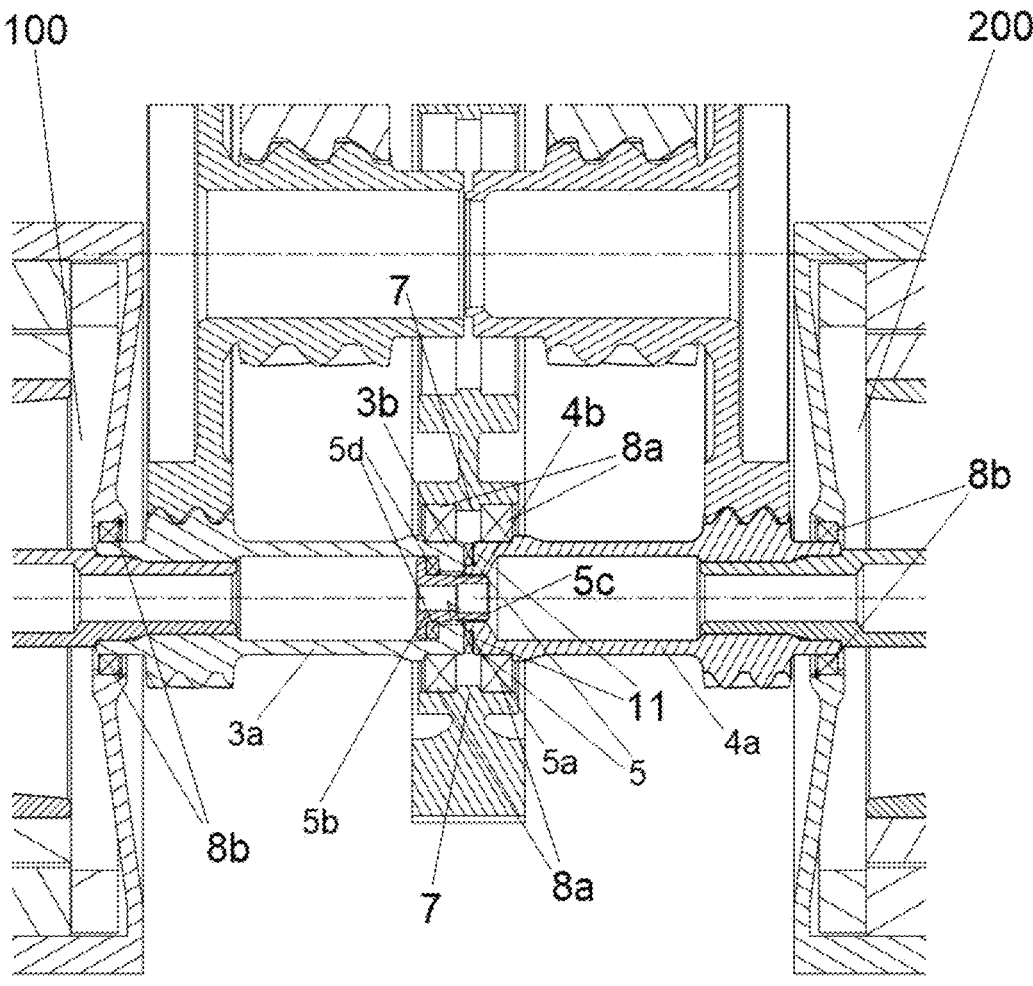
FIGS. 4 and 5 are cross-section views of further possible embodiments of the drivetrain as in the disclosure.

Conveniently, in the embodiment depicted in FIG. 4 the present disclosure may provide that the intermediate element (5) is cooperating with a central bushing (5a): such a central bushing (5a) has two mutually opposite first and second end (5b; 5c) respectively connected to a proximal end of the first transfer shaft (3a) and to a proximal end of the second transfer shaft (4a) so as to allow relative rotation of the first transfer shaft (3a) with respect to the second transfer shaft (4a).

The just cited proximal ends of the first and second transfer shafts (3a; 4a) are conveniently placed in the mutual proximity area (6), and the disclosure allows for a distribution and/or equalization of axial forces/loads directed "outwards" in the transfer shafts (3a; 4a) themselves.

More in detail, and referring to exemplificative FIG. 4, the first end (5b) of the central bushing (5a) is in contact with (or, otherwise stated, it is touching) the proximal end of the first transfer shaft (3a), while the second end (5c) of the central bushing (5a) is integrally engaged with the proximal end of the second transfer shaft (4a) (e.g., by ways of a thread/screw engagement or by any other equivalent connection means): in this arrangement, the interconnection between the two transfer shafts (3a; 4a) allows relative rotation but at the same time allows for axial loads/forces re-distribution and "equalization", allowing at the same time a downsizing in the overall dimensions of the components of the present drivetrain with respect to known types of such devices.

As in other possible embodiments of the disclosure, the central bushing (5a) can be made in a single piece with one of the two shafts (3a) or (4a): in other possible embodiments, the end (5b) or (5c) in contact with the other shaft (4a) or (3a) can conveniently be screwed on or held on with any suitable connecting element.

It is to be noted that in the embodiment just represented the capability of allowing relative rotation between the transfer shafts (3a; 4a) may be enhanced by ways of a second intermediate element (5d) interposed between the first end (5b) of the central bushing (5a) and the proximal end of the first transfer shaft (3a), and at the same time the interconnection between the central bushing (5a) and the proximal ends of the transfer shafts (3a; 4a) may be adjusted in terms of axial mechanical interference: for example, by operating on the thread/screw engagement it is possible to impart a given preload to the interconnection, or it is also possible to allow for some axial clearance between the two transfer shafts (3a; 4a) as in design and/or operative requirements desired/needed.

As in further possible variants of this embodiment, the thread/screw engagement between the central bushing (5a) and the second transfer shaft (4a) may be chosen in order to achieve further technical effects: for example, the thread can be of the "tapered" and/or of the "oversized" type (in order to void unscrewing of the central bushing from the transfer shaft): otherwise stated, the male thread or the female thread may be realized with a dimensional and/or pitch difference, so as to simulate an interference fit.

Figure 5:
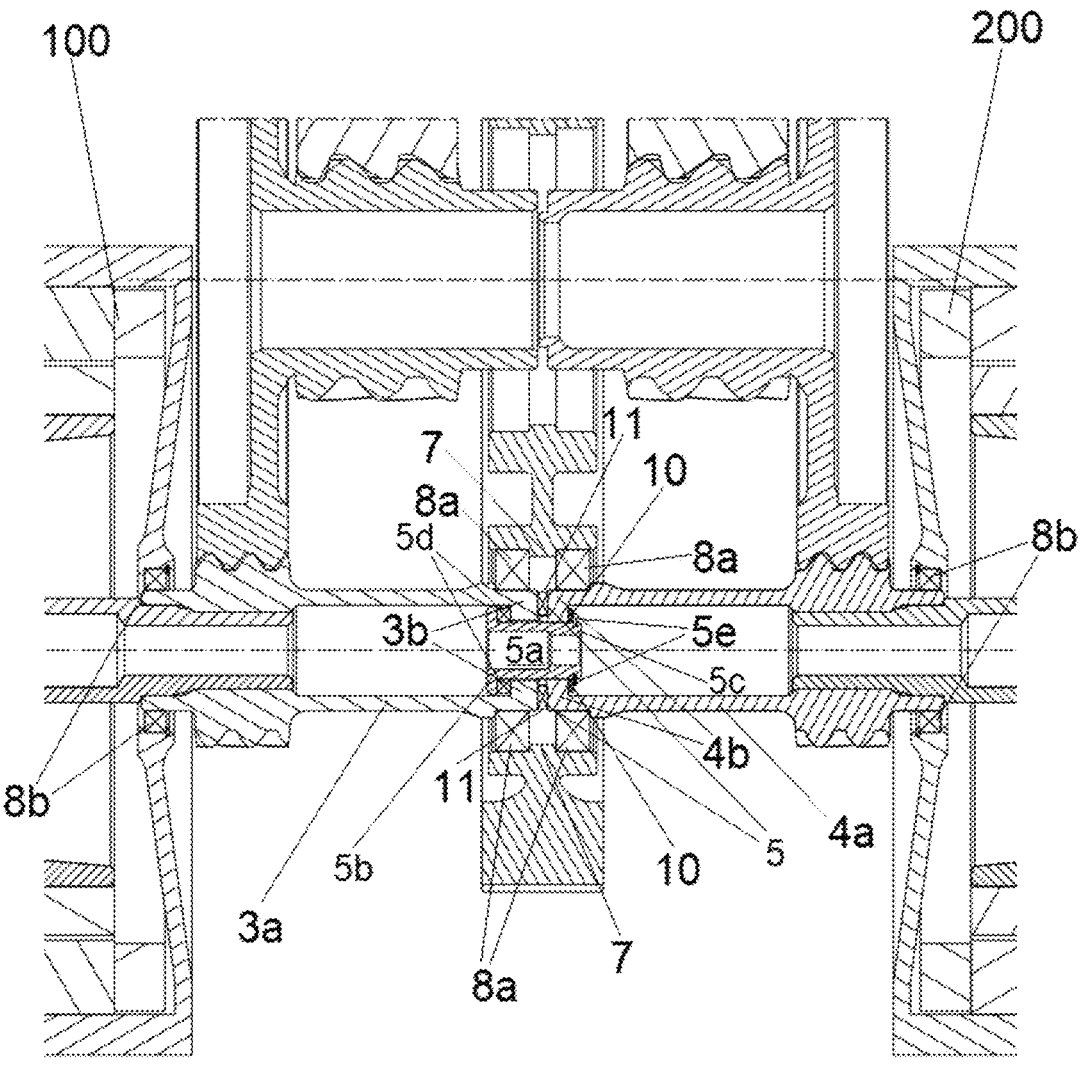

An additional embodiment of the disclosure capable to cope with outwardly directed axial forces/loads is represented in FIG. 5, wherein a central bushing (5a) having a first end (5b) and a second end (5c) is interfaced into the proximal ends of the first transfer shaft (3a) and of the second transfer shaft (4a), while maintaining an axial constraint between the two transfer shafts (3a; 4a) themselves: this further embodiment allows relative shafts' rotation and at the same time allows for axial loads/forces re-distribution and "equalization" in presence of outwardly directed forces/ loads.

It is to be noted that in the embodiment depicted in FIG. 5 the central bushing (5a) is still capable to axially retaining both the first and the second transfer shafts (3a; 4a): this kind of interconnection is made possible through the presence of suitably shaped retainers (5e), which are coaxially mounted on the central bushing (5a) and are located between and end of the central bushing (5a) (e.g., in annexed FIG. 5, the second end (5c) and the proximal end of the second transfer shaft (4a)).

The embodiment illustrated in FIG. 5 may also provide for a given degree of pre-load to be exerted between the transfer shafts (3a; 4a), the intermediate element (5), the second intermediate element (5a) and the central bushing (5a): such a preload may exemplificatively attained through suitable choice of geometric dimensions and relative tolerances, or it may also be determined by suitably heating the central bushing (5a) itself during assembly and/or by cooling down the shaft's assembly. The just cited heating and/or cooling operations conveniently determine an increase of relative dimensions and to produce a given axial (mutual) clearance, as these structural components mutually exchange heat and therefore reach the same "final" temperature (and, consequently, a desired level of mechanical interference or even a given axial tolerance, if required/needed).

The present disclosure is also capable, through a suitable choice of design parameters of its structural features, to efficiently cope with "unbalanced" axial forces/loads schemes, which may, for example, derive from a travelling condition of the vehicle along a curved path or whenever a torque vectoring action is required by the driver or by the onboard active safety/management systems (such as the ABS, TCS or ESC): in these cases, any eventual net difference in quantitative terms of axial loads coming from one side (or half-space) or from the other side (or half-space) of the drivetrain (1) is managed in such a way that the unbalancing itself is minimized and discharged/distributed onto the most suitable components of the drivetrain (1) itself.

Delving deeper in the details and recalling the functional aims of the present disclosure, it can be seen that the intermediate element (5) may comprise any known type of bearing (e.g., a plain bearing, a ball bearing or a roller bearing): at the same time, the drivetrain (1) also comprises a first transfer shaft (3a), belonging to the first driving line (3), and a second transfer shaft (4a), belonging to the second driving line (4).

The just cited first and second transfer shafts (3a), (4a) are mutually facing each other in correspondence of an internal space which is defined, in the wording of the present disclosure, by a mutual proximity area (6) (which can be indicatively seen in FIG. 3): otherwise stated, the intermediate element (5) is directly interposed between the first transfer shaft (3a) and the second transfer shaft (4a). Conveniently, in order to guarantee correct and stable positioning of the intermediate element (5), a seating (11) adapted to house at least partially the intermediate element (5) can be provided into the most suitable portion of the first transfer shaft (3a) and/or of the second transfer shaft (4a): such a seating (11) is typically counter-shaped to the intermediate element (5) and can conveniently be integrally located in the first transfer shaft (3a) and/or in the second transfer shaft (4a) in correspondence of the mutual proximity area (6).

In a possible embodiment of the disclosure, the drivetrain (1) may further comprise at least a shoulder (7), which is active between at least the first transfer shaft (3a) and the second transfer shaft (4a).

From a functional standpoint, the shoulder (7) is adapted/dedicated to share and transmit:

axial loads active in the first driving line (3) into the second driving line (4); and/or axial loads active in the second driving line (4) into the first driving line (3); and/or axial loads active into the first and/or second driving line (4, 3) into the frame (2), thereby cooperating with the other structural components of the disclosure in sharing, re-distributing and/or countering axial loads arising from the intermeshing gears when they undergo a "torque flow".

As in further possible embodiments of the disclosure, the drivetrain (1) may also comprise:

a predetermined number of auxiliary inner bearings (8a) located in the frame (2) and associated at least with the first transfer shaft (3a) and/or with the second transfer shaft (4a), which are located in the mutual proximity area (6);

a predetermined number of auxiliary outer bearings (8b) located in the frame (2) and in correspondence of ends of the first transfer shaft (3a) and/or of the second transfer shaft (4a) which can be considered as "opposite" with respect to shafts' ends residing in the mutual proximity area (6)); and a predetermined number of bearing fixation elements (9) interposed between the frame (2) and the intermediate element (5) and/or the central bushing (5a) and/or the inner/outer auxiliary bearings (8a; 8b).

The inner and/or outer auxiliary bearings (8a; 8b) may be implemented in any suitable form (even of the known type), according to design and/or performance requirements.

Figure 3:
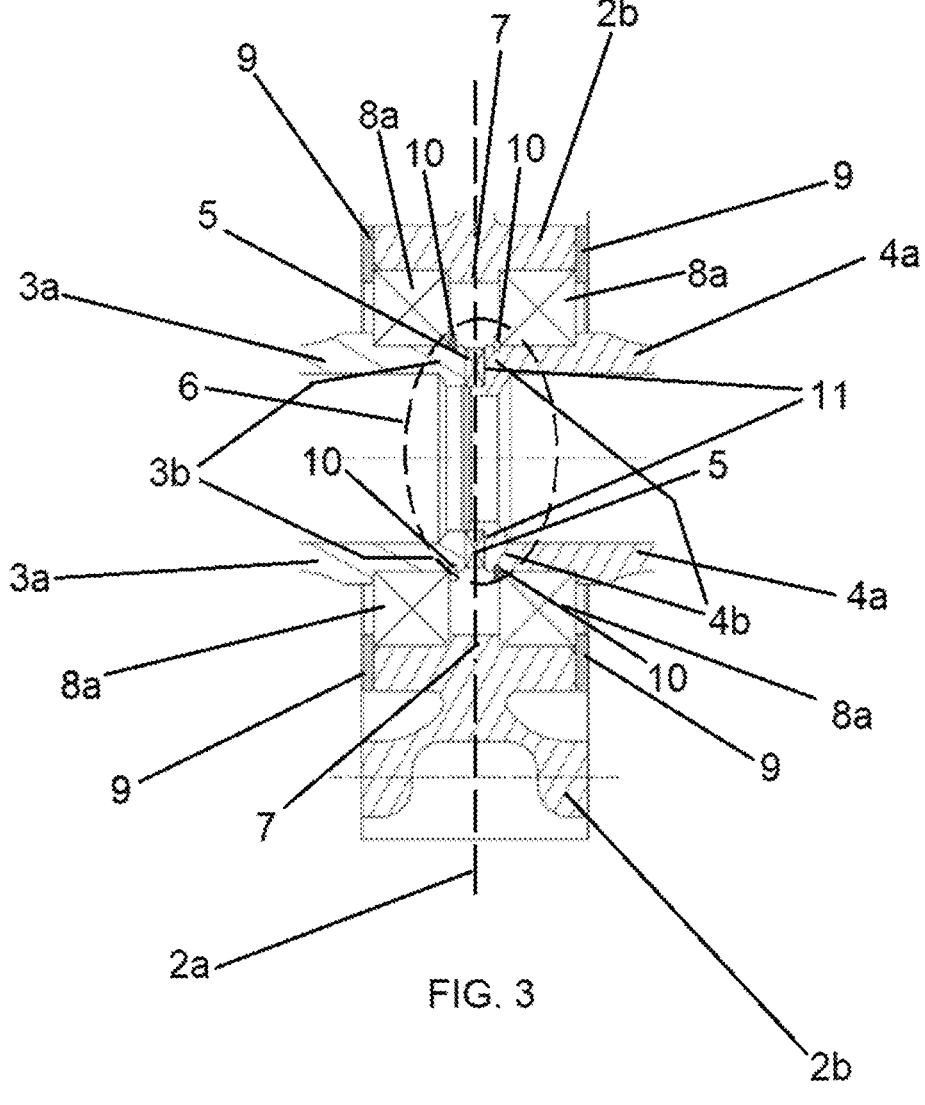
FIG. 3 is a cross-section view of a further possible embodiment of the drivetrain as in the disclosure.

Looking at the exemplificative embodiment depicted in FIG. 3, it can be seen that the disclosure may also comprise a shoulder (7) which is integrally protruding from the central supporting member (2b) and is cooperatively acting with said at least intermediate element (5): in order to gain a significant behavioral symmetry, the central supporting member (2b) may comprise the shoulder (7) circularly extending, in the mutual proximity area (6), around the intermediate element (5) and/or in proximity or in contact with the auxiliary inner bearings (8a).

A functional advantage of the shoulder (7) consists in a helping the distribution of the axial forces/loads, for example in occurrence of peculiar driving conditions such as "extreme torque vectoring" conditions and so on.

Again, as in a further possible embodiment of the present disclosure, suitable axial pre-loading structure (10) can be provided: such axial pre-loading structure (10) are functionally cooperating with one or more of the inner/outer auxiliary bearings (8a; 8b) (or even and/or on the intermediate element (5) and/or on the central bushing (5a)) in order to impart them a suitable axial pre-load as in the design and/or operative requirements.

From a merely structural (and exemplificative) standpoint, the axial pre-loading structure (10) may be realized as in any type of known technique and/or device: for example, they can be realized with solid and/or substantially non-deformable elements such as shims, nuts, covers or any other fairly incompressible or rigid part/component, or also with springs or any other functionally equivalent elastic or "compressible" devices, provided that they are capable to exert an appropriate amount of pre-load on the structural components to which they are structurally related.

More in general, the axial pre-loading structure (10) may also be implemented in other layouts, even of the known type (and therefore not depicted in the exemplificative figures), and from a functional standpoint they can be operatively active on the intermediate element (5) and/or on the central bushing (5a) and/or on the inner/outer auxiliary bearings (8a; 8b).

In order to achieve a better understanding of the disclosure, a first possible working condition of the drivetrain (1) may be illustrated wherein the two driving lines (3) and (4) are transmitting the same torque: in such a scenario, the driving lines (3) and (4) (which, for the sake of illustration of the disclosure, may be regarded as transmitting a "positive torque" which causes axial loads acting opposite/inward due to gears having a respectively opposite helix angle), axial forces/loads coming from the two driving lines (3) and (4) are fully cancelled out by the intermediate element (5).

In this first exemplificative scenario, the axial forces/loads coming from the first driving line (3) are exerted towards the second driving line (4), while the axial forces/loads coming from the second driving line (4) are exerted towards the first driving line (3): since the first driving line (3) is linearly adjacent to the second driving line (4), and the intermediate element (5) is interposed between the first driving line (3) and the second driving line (4), the axial forces/loads coming from the first driving line (3) towards the second driving line (4) cancel out the axial forces/loads coming from the second driving line (4) towards the first driving line (3) up to a point wherein the net value of the sum of such axial forces/loads is equal to zero.

Beside this possible working condition (or "scenario"), another possible second scenario may be devised, wherein the two driving lines (3) and (4) are both generating respective positive torques, whose values/amounts are different: in this second scenario, the axial forces/loads are cancelled out up to the minimum "common" value using the intermediate element (5).

In this second exemplificative scenario, the axial forces/loads coming from the first driving line (3) are exerted towards the second driving line (4), while the axial forces/loads coming from the second driving line (4) are exerted towards the first driving line (3): since the first driving line (3) is linearly adjacent to the second driving line (4), and the intermediate element (5) is interposed between the first driving line (3) and the second driving line (4), the axial forces/loads coming from the first driving line (3) towards the second driving line (4) cancel out the axial forces/loads coming from the second driving line (4) towards the first driving line (3) up to a point wherein the net value of the sum of such axial forces/loads is equal to the jus cited "minimum common value".

A third scenario wherein the present disclosure may be exerting its technical effects may be consisting in the two driving lines (3) and (4) being subjected to a so-called negative torque, which may be defined as a torque causing axial loads directed towards the external surfaces/portions of the frame (2) (such torque may for example derive from the regenerative system of the vehicle): in this scenario, axial forces/loads coming from the two driving lines (3) and (4) are transferred to the frame (2) by the bearing fixation elements (9) and/or the central bushing (5*a*) and/or the outer auxiliary bearings (8*b*), and more in detail the central bushing (5*a*) allows or supports the second intermediate element (5*d*) which allows the canceling of outward acting axial forces.

In this third exemplificative scenario, the axial forces/loads coming from the first driving line (3) and from the second driving line (4) are exerted towards the outer sides of the frame (2), and the central bushing (5*a*) supports the second intermediate element (5*d*) which allows the canceling of outward acting axial forces: such a cancellation may be interpreted as a reduction of the net outward acting forces to a "lowest common value", which in turn Is transferred to the frame (2) through the auxiliary outer bearings (8*b***).

As already mentioned before, in the embodiment in FIG. 6, circlips (12) or any other suitable (and functionally equivalent) means can be associated with the inner auxiliary bearings (8*a*) and/or with the outer auxiliary bearings (8*b*), and they also can be combined, according to various operative and/or performance requirements, with one or more of the other structural features described and/or claimed.

Figure 6:
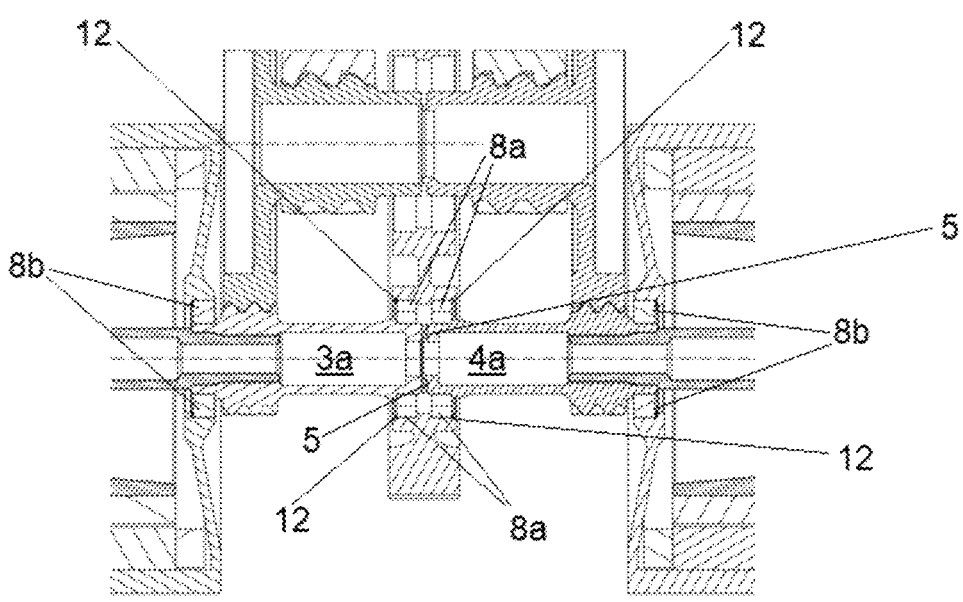
FIGS. 6 and 7 are cross-section views of further possible embodiments of the drivetrain as in the disclosure.
Figure 7:
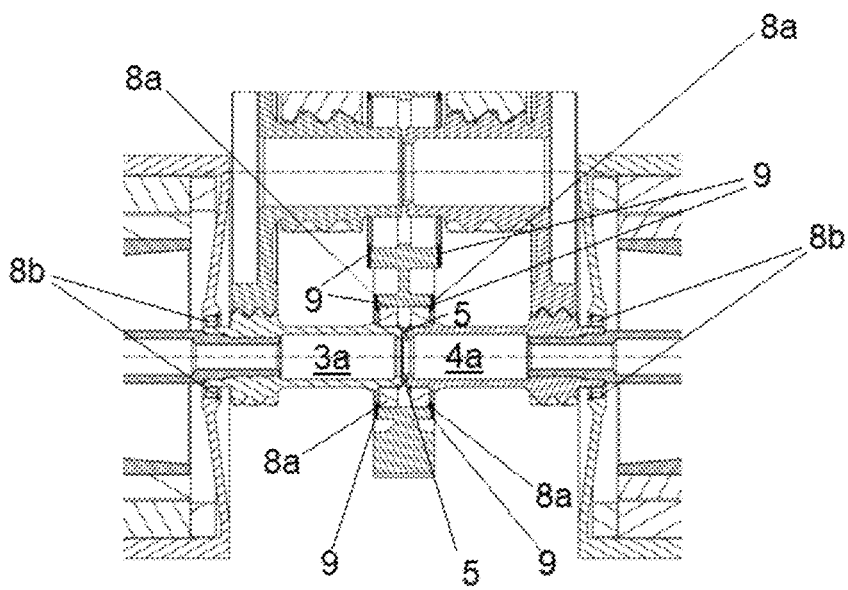
Figure 7A:
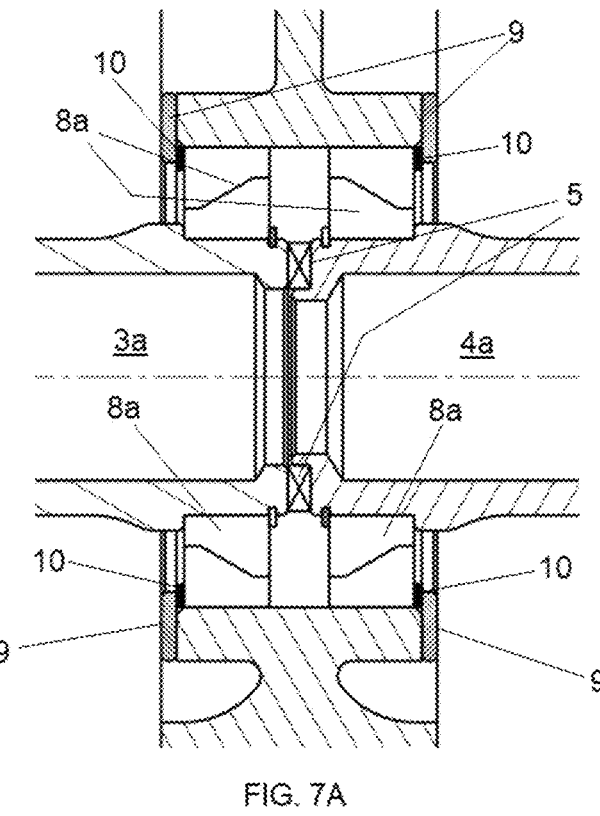
FIG. 7a is a zoomed-in view of FIG. 7.

At the same time, looking at the embodiments shown in FIGS. 6 and 7, it is possible to see that so-called "tapered" bearings can be implemented in the present disclosure (more specifically: in FIG. 6, tapered bearings are used as outer auxiliary bearings (8*b*), while in FIG. 7 tapered bearings are used as inner auxiliary bearings (8*a*)), while looking at the zoomed-in FIG. 7*a* it is possible to observe that bearing fixation elements (9) are structurally and functionally cooperating with pre-loading structure (10), hereby represented as "shims", in order to set a suitable amount of axial pre-load to the inner auxiliary bearings (8*a***).

Figure 8:
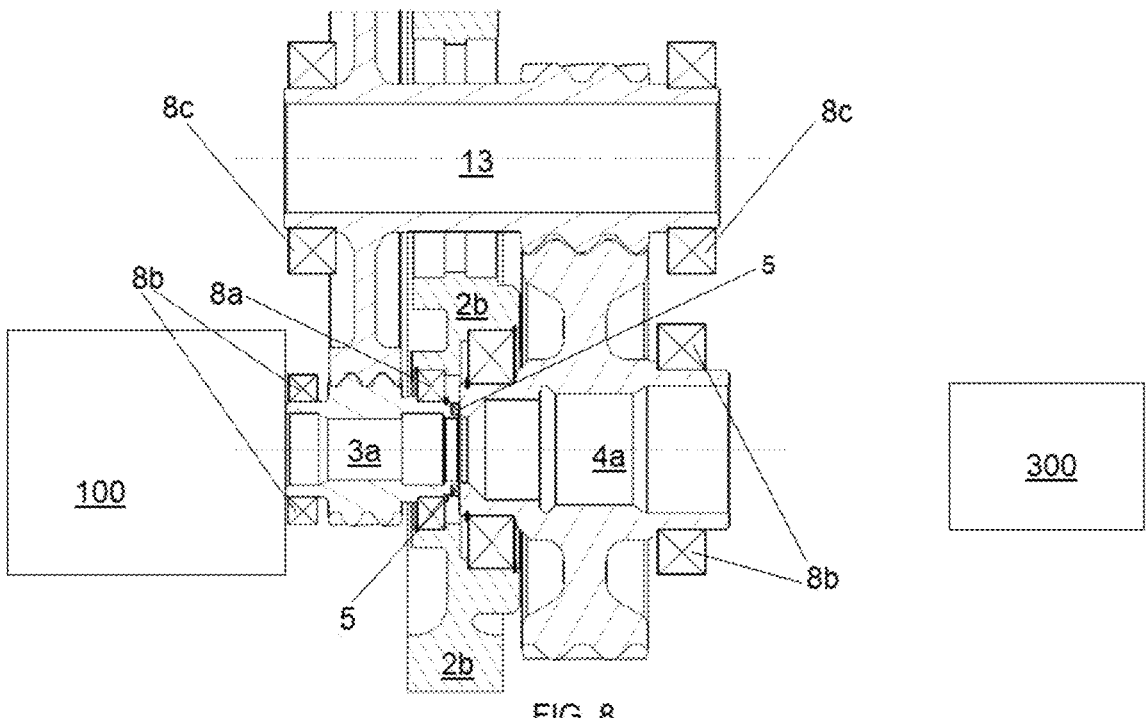
FIG. 8 is a cross-section view of a further possible embodiment of the present disclosure.

Looking now at FIG. 8, a further embodiment of the disclosure is shown, wherein only one of the shafts (3*a*) or (4*a*) is receiving power from a first torque transfer element (e.g., a motor schematically indicated with reference numeral (100) in FIG. 8): such power, generating a corresponding "torque flow" is transferred along the first shaft (3*a*) through and intermediate cross plane shaft (13) towards a second shaft (4*a*), which is connected by suitable means to an "output device" schematically indicated with the reference numeral (300) in FIG. 8 (such an output device may for example be a wheel or a differential or an axle and so on): in this embodiment, the intermediate element (5) is located, once again, between the first shaft (3*a*) and the second shaft (4*a*) and is able to cancel out axial forces between the two shafts.

Focusing on the functional aspects of the just introduced embodiment, it is to be observed that the rotational speed ratio between the first shaft (3*a*) and the second shaft (4*a*) is fixed, as it is dependent upon the transmission ratio established by the intermediate cross plane shaft (13), which is obviously located between the first and second shafts (3*a*; 4*a*) so as to compenetrate and/or pass through the central supporting member (2*b*).

At the same time, it is to be noted that in the embodiment shown in FIG. 8, the axial forces/loads arise, as in the previous embodiments, because of the helix angle on the gear teeth on point of contact between the two gears (and conveniently, the second shaft (4*a*) can be axially aligned with the first shaft (3*a*)).

Conveniently, the embodiment shown in FIG. 8 might find application not only in single motor gearboxes, but also in non-automotive applications (such as, for example, turbine/power generation, test apparatuses, agricultural machinery). The embodiment shown in FIG. 8 can conveniently be implemented with one or more of the additional technical features already illustrated in relationship with the other embodiments of the present disclosure hereabove described and/or herebelow claimed.

The described, illustrated and claimed disclosure achieves the aforecited technical aims and surpasses the shortcomings of the prior art hereabove mentioned, starting but not being limited to the advantage consisting in a very high degree of volumetric compactness, joined with the capability of withstanding high axial (internal) loads and with the allowance for shorter (or maybe even shortest) load paths for axial forces in some driving conditions in a very wide array of possible driving situations (which respectively correspond to different driving inputs given by a user of the vehicle in which such a gearbox is mounted).

Besides, the overall structural architecture of the drivetrain/gearbox may be implemented, in some cases with respect to known types of gearboxes/drivetrains, with a reduced overall number of components, thereby determining a cost-effective design/building process, in a particularly remarkable relationship with the "T-shaped design/configuration" of the drivetrain itself and therefore allowing for a very efficient dealing with balanced and/or unbalanced axial loads within such a gearbox design in various operative conditions of the vehicle in which the gearbox itself is mounted.

Furthermore, the overall structure of the present disclosure can be implemented in various embodiments, so as to cope with various ranges of torque outputs, maximum rotational speed values and whatever else operating parameter involved with the coupling of two (or more) engines/motors to the drivetrain as in the disclosure.

Finally, the drivetrain assembly as in the present disclosure can also be implemented in any other embodiment enclosed in its inventive concept as claimed, also by way of collateral modifications available to a skilled technician in the technical sector of pertinence of the disclosure itself, and thus maintaining the functional achievements of the disclosure along with practicality of production, usage and maintenance.

The invention claimed is:

1. A drivetrain for vehicles, comprising:

a frame;

a first driving line supported by said frame and connectable to a first torque transfer element;

a second driving line supported by said frame and connectable to a second torque transfer element;

at least an intermediate element directly interposed between the first driving line and the second driving line;

inner auxiliary bearings located in proximity of proximal ends of a first transfer shaft of the first driving line and/or a second transfer shaft of the second driving line within a mutual proximity area; and outer auxiliary bearings located in correspondence of opposite ends of the first transfer shaft and/or the second transfer shaft with respect to shafts' ends residing in the mutual proximity area, wherein said intermediate element is adapted to share and transmit one or more of the following:

axial loads active in the first driving line into the second driving line;

axial loads active in the second driving line into the first driving line; and axial loads active into the first and/or second driving line into the frame, wherein said intermediate element, the second driving line and the first driving line are operatively interconnected so that axial loads mutually exchanged between the intermediate element, the second driving line and the first driving line are cancelled out to a minimum common value, through the intermediate element itself;

wherein the intermediate element comprises a bearing which allows relative rotational speed between shafts belonging to the first driving line and the second driving line;

wherein said intermediate element is residing in the mutual proximity area defined in correspondence of a central plane of the frame, said central plane comprising at least a central supporting member and defining a first half-space and a second half-space opposite to said first half-space with respect to said central plane, each of said first and second half-spaces respectively housing the first driving line and the second driving line;

wherein the first transfer shaft belongs to the first driving line;

wherein the second transfer shaft belongs to the second driving line, said first and second transfer shafts being mutually facing each other in correspondence of the mutual proximity area, the intermediate element being directly interposed between said first transfer shaft and said second transfer shaft;

wherein the first transfer shaft includes a first end face, and the second transfer shaft includes a second end face facing the first end face, wherein the intermediate element is positioned between the first transfer shaft and the second transfer shaft such that the intermediate element remains in direct contact with each of the first end face and the second end face;

wherein the drivetrain further comprises a central bushing cooperating at least with said intermediate element, said central bushing having two mutually opposite first and second ends respectively interfaced with the proximal end of the first transfer shaft and to the proximal end of the second transfer shaft, said proximal ends of the first and second transfer shafts being located in the mutual proximity area;

wherein the first end of the central bushing is interfaced with the proximal end of the first transfer shaft; and wherein the second end of the central bushing is integrally engaged with the proximal end of the second transfer shaft.

2. The drivetrain as claimed in claim 1, further comprising a second intermediate element interposed between one or more of:

the first end of the central bushing and the proximal end of the first transfer shaft; and the second end of the central bushing and the proximal end of the second transfer shaft.

3. The drivetrain as claimed in claim 2, wherein said central bushing having the first end and the second end is interfaced with the proximal end of the first transfer shaft and also interfaced with the proximal end of the second transfer shaft while maintaining an axial constraint between the two transfer shafts.

4. The drivetrain as claimed in claim 3, further comprising retainers coaxially mounted on the central bushing and located between the first end or the second end of the central bushing, the second end and the proximal end of the first or the second transfer shaft.

5. The drivetrain as claimed in claim 4, further comprising a predetermined number of bearing fixation elements interposed between the frame and the intermediate element and/or the central bushing and/or the inner auxiliary bearings and/or the outer auxiliary bearings.

6. The drivetrain as claimed in claim 5, further comprising axial pre-loading structure cooperatively active on one or more of the following:

the intermediate element;

the central bushing;

the second intermediate element;

one or more of said inner auxiliary bearings; and one or more of said outer auxiliary bearings.

7. A drivetrain for vehicles, the drivetrain comprising:

a frame, having a central plane dividing the frame between a first half-space and a second half-space mutually opposite to the first half-space; and a first driving line supported by said frame, housed within the first half-space and connectable to a first torque transfer element, the first driving line having a first transfer shaft;

a second driving line supported by said frame, housed within the second half-space and connectable to a second torque transfer element, the second driving line having a second transfer shaft, wherein the first and second transfer shafts being mutually facing each other; and at least an intermediate element directly interposed between the first and second transfer shafts, such that the intermediate element remains in direct contact with each of a first end face of the first transfer shaft and the second end face of the second transfer shaft, whereby axial forces from first transfer shaft and from the second transfer shaft are cancelled out by the intermediate element;

wherein said intermediate element is adapted to share and transmit one or more of the following:

axial loads active in the first driving line into the second driving line;

axial loads active in the second driving line into the first driving line; and axial loads active into the first and/or second driving line into the frame;

wherein said intermediate element, the second driving line and the first driving line are operatively interconnected so that axial loads mutually exchanged between the intermediate element, the second driving line and the first driving line are cancelled out to a minimum common value, through the intermediate element itself;

wherein the intermediate element comprises a bearing which allows relative rotational speed between shafts belonging to the first driving line and the second driving line;

wherein said intermediate element is residing in the mutual proximity area defined in correspondence of a central plane of the frame, said central plane comprising at least a central supporting member and defining a first half-space and a second half-space opposite to said first half-space with respect to said central plane, each of said first and second half-spaces respectively housing the first driving line and the second driving line;

wherein the first transfer shaft belongs to the first driving line;

wherein the second transfer shaft belongs to the second driving line, said first and second transfer shafts being mutually facing each other in correspondence of the mutual proximity area, the intermediate element being directly interposed between said first transfer shaft and said second transfer shaft;

wherein the first transfer shaft includes a first end face, and the second transfer shaft includes a second end face facing the first end face, wherein the intermediate element is positioned between the first transfer shaft and the second transfer shaft such that the intermediate element remains in direct contact with each of the first end face and the second end face;

wherein the drivetrain further comprises a central bushing cooperating at least with said intermediate element, said central bushing having two mutually opposite first and second ends respectively interfaced with the proximal end of the first transfer shaft and to the proximal end of the second transfer shaft, said proximal ends of the first and second transfer shafts being located in the mutual proximity area;

wherein the first end of the central bushing is interfaced with the proximal end of the first transfer shaft; and wherein the second end of the central bushing is integrally engaged with the proximal end of the second transfer shaft.

8. The drivetrain as claimed in claim 7, further comprising inner auxiliary bearings located in proximity of the proximal ends of the first and/or the second transfer shafts within the mutual proximity area.

9. The drivetrain as claimed in claim 8, further comprising outer auxiliary bearings located in correspondence of opposite ends of the first transfer shaft and/or the second transfer shaft with respect to shafts' ends residing in the mutual proximity area.

10. The drivetrain as claimed in claim 7, wherein a seating is provided on at least one of the first transfer shaft and the second transfer shaft, within the mutual proximity area.

11. The drivetrain as claimed in claim 10, wherein the seating is counter-shaped to the intermediate element to accommodate the intermediate element therein.

\* \* \* \* \*